June 16, 1964  C. S. REED  3,137,489
SEAT SPRING STRUCTURE
Filed May 9, 1963  2 Sheets-Sheet 1

INVENTOR.
CLAIR S. REED
BY
ATTORNEYS

June 16, 1964 C. S. REED 3,137,489
SEAT SPRING STRUCTURE
Filed May 9, 1963 2 Sheets-Sheet 2

INVENTOR.
CLAIR S. REED
BY
Whittemore, Hulbert & Belknap
ATTORNEYS

United States Patent Office 3,137,489
Patented June 16, 1964

3,137,489
SEAT SPRING STRUCTURE
Clair S. Reed, Detroit, Mich., assignor to Van Dresser Specialty Corporation, Warren, Mich., a corporation of Michigan
Filed May 9, 1963, Ser. No. 279,076
8 Claims. (Cl. 267—103)

This invention relates generally to seat spring structures, and refers more particularly to an improved spring structure of a seat and to an improved means for anchoring such spring structure to a seat frame.

One of the essential objects of the invention is to provide a seat spring structure wherein a single upwardly arched layer of load supporting heavy gauge spring wires serves as the sole supporting spring structure of the seat and provides the desired cushioning effect.

Another object is to provide a seat spring structure wherein the spring wires mentioned are provided at longitudinally spaced points thereof throughout their length with loops or rings that are operable to improve the spring action of said spring wires and that are preferably arranged horizontally to cooperate with the spring wires for supporting superposed seat upholstery, such as a burlap and wire insulator or any other suitable commercial insulator, one or more layers of sponge rubber or other suitable padding, and the exterior trim fabric of the seat.

Another object is to provide a seat spring structure wherein all of the spring wires are provided at their opposite ends with integral laterally extending attaching portions, and means are provided for securing said attaching portions to the seat frame.

Another object is to provide a seat spring structure that is simple in construction, more economical to manufacture, and efficient in operation.

Other objects, advantages and novel details of construction of this invention will be made more apparent as this description proceeds, especially when considered in connection with the accompanying drawings wherein.

Figure 1:
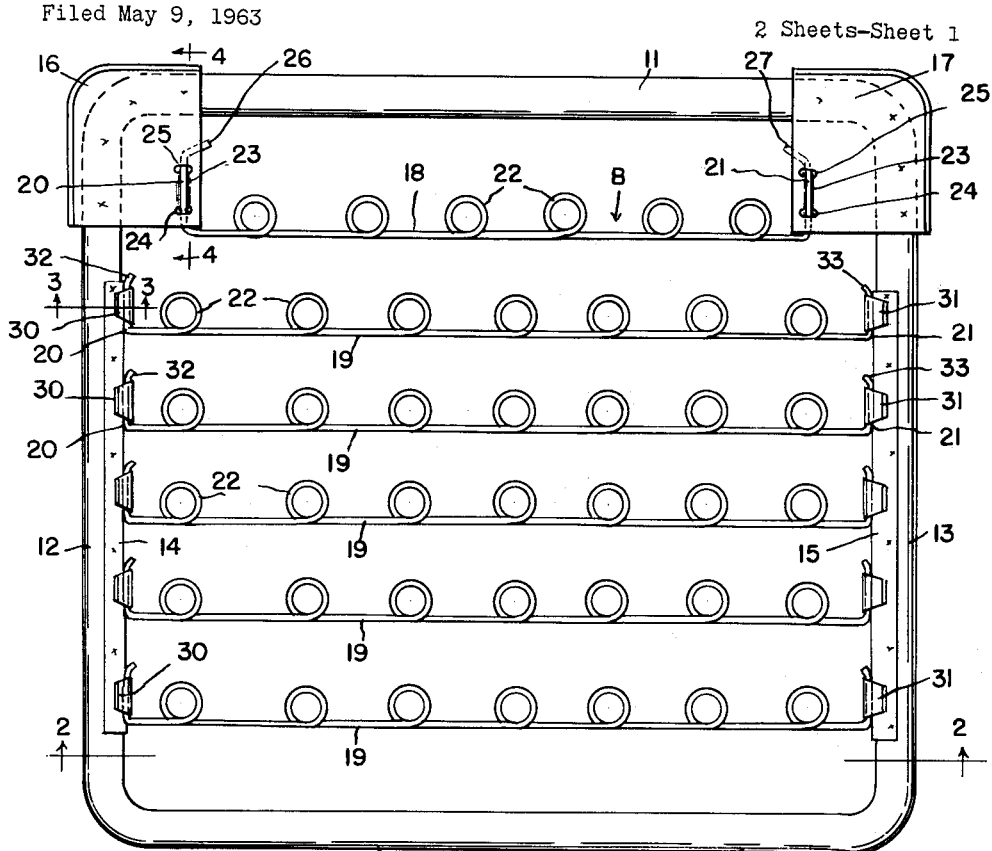
FIGURE 1 is a top plan view of the seat spring structure.
Figure 2:
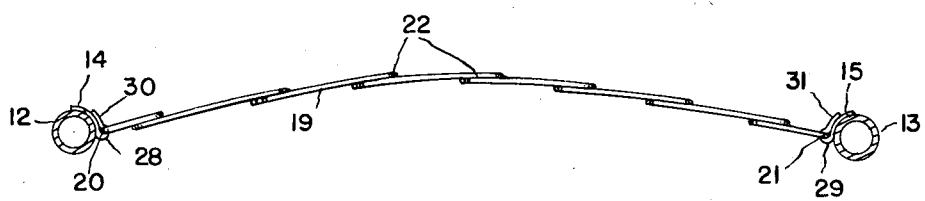
FIGURE 2 is a transverse sectional view taken substantially on the line 2—2 of FIGURE 1.
Figure 3:
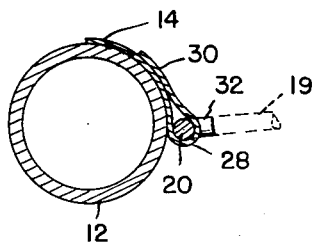
FIGURE 3 is a fragmentary sectional view taken substantially on the line 3—3 of FIGURE 1.
Figure 4:
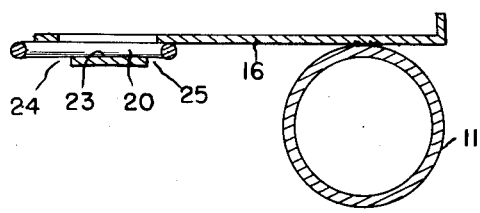
FIGURE 4 is a fragmentary sectional view taken substantially on the line 4—4 of FIGURE 1.
Figure 5:
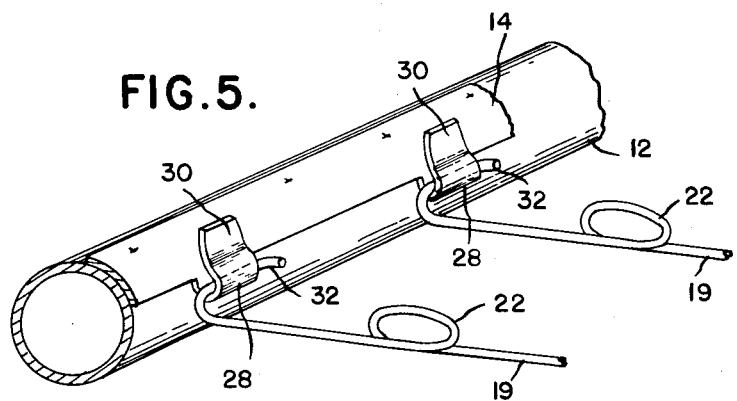
FIGURE 5 is a fragmentary perspective view the left hand transversely extending side member and the transversely extending metal strip secured thereto, and showing two of the tongues of the strip in bent-over interlocked relation with the attaching portions of two of the longitudinally extending spring wires.
Figure 6:
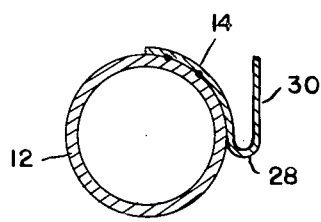
FIGURE 6 is a cross sectional view through the left hand transversely extending side member and the transversely extending metal strip secured thereto, and showing one of the tongues of the strip in open position to receive an attaching portion of one of the longitudinally extending spring wires.
Figure 7:
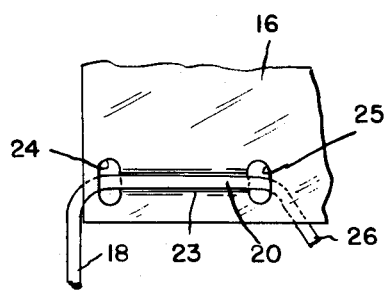
FIGURE 7 is a fragmentary top plan view of one of the horizontally disposed metal plates, and showing an attaching portion of one of the longitudinally extending spring wires secured to said plate.

Referring now to the drawings, A is a metallic supporting seat frame having spaced substantially parallel longitudinally extending tubular front and rear members 10 and 11 respectively, and having spaced substantially parallel transversely extending tubular side members 12 and 13 respectively extending between and terminally secured to said longitudinally extending members 10 and 11 at opposite ends thereof.

14 and 15 respectively are transversely extending metal strips of substantially C cross section embracing and welded in surface to surface relation to the upper and inner surfaces of the transversely extending members 12 and 13 intermediate the ends thereof, and 16 and 17 respectively are horizontally disposed metal plates located at the rear corners of the seat frame and welded to the upper surfaces of the transversely extending members 12 and 13 and to the upper surface of the rear longitudinally extending member 11.

B is a single upwardly arched layer of load supporting heavy gauge spring wires 18 and 19 respectively extending longitudinally of the seat frame and serving as the sole supporting spring structure of the seat.

As shown, all of the spring wires 18 and 19 are provided at their opposite ends with integral laterally extending attaching portions 20 and 21, and are provided at longitudinally spaced points thereof between and substantially in transverse alignment with said attaching portions with horizontally extending loops or rings 22.

Preferably the spring wires 18 and 19 may be of any heavy gauge spring metal consistent with resiliency and the strength required to serve as spring supports. For example, such wires 18 and 19 may be eight, nine, or ten gauge spring steel, and may be approximately one-eighth inch or larger in diameter.

The longitudinally extending spring wire 18 at the rear of the frame A is shorter than the other spring wires 19 of the arched layer B and is terminally secured to the horizontally disposed metal plates 16 and 17. As shown, each of the metal plates 16 and 17 has a transversely extending groove 23 therein adjacent its inner edge, and has aligned openings 24 and 25 therein at opposite ends of said groove 23. The laterally extending attaching portions 20 and 21 of the spring wire 18 extend through the aligned openings 24 and 25 in the respective metal plates 16 and 17 and are seated in the grooves 23 in said metal plates 16 and 17. Preferably the free ends 26 and 27 of the attaching portions 20 and 21 of the spring wire 18 are bent inwardly to preclude such attaching portions 20 and 21 from becoming accidentally disengaged from the grooves 23 in said metal plates 16 and 17.

The other spring wires 19 are of uniform length and are terminally secured to the metal strips 14 and 15. As shown, the lower edges of the metal strips 14 and 15 are provided at longitudinally spaced points thereof with integral substantially L-shaped tongues 28 and 29 that initially extend upwardly to receive the laterally extending attaching portions 20 and 21 of the spring wires 19. The upright portions 30 and 31 respectively of such tongues 28 and 29 are then bent over and interlocked with the attaching portions 20 and 21 of the spring wires 19, so that such spring wires 19 are anchored to said metal strips 14 and 15. Preferably the free ends 32 and 33 of the attaching portions 20 and 21 of the spring wires 19 are bent inwardly to preclude such attaching portions 20 and 21 from becoming accidentally disengaged from the tongues 28 and 29 of the metal strips 14 and 15.

In use, the upwardly arched single layer B of spring wires 18 and 19 serves as a supporting cushion for superposed seat upholstery (not shown), such as a burlap and wire insulator or any other suitable commercial insulator, one or more layers of sponge rubber or other suitable padding, and the exterior trim fabric of the seat.

What I claim as my invention is:

1. A seat spring structure, comprising a seat frame having spaced substantially parallel longitudinally extending front and rear members and having spaced substantially parallel transversely extending side members terminally secured to said longitudinally extending members at opposite ends thereof, transversely extending metal strips welded to and extending lengthwise of said transversely extending members intermediate the ends thereof, horizontally disposed metal plates welded to the rear longitudinally extending member and to said transversely extending side members, and a single upwardly arched layer of load supporting spring wires extending longitudinally of said seat frame and serving as the sole supporting spring structure of the seat, one of said spring wires being terminally secured to said metal plates, and the other of said spring wires being terminally secured to said metal strips.

2. A seat spring structure, comprising a seat frame having spaced substantially parallel longitudinally extending front and rear members and having spaced substantially parallel transversely extending side members terminally secured to said longitudinally extending members at opposite ends thereof, transversely extending metal strips welded to and extending lengthwise of said transversely extending members intermediate the ends thereof, horizontally disposed metal plates welded to the rear longitudinally extending member and to said transversely extending side members, and a single upwardly arched layer of load supporting spring wires extending longitudinally of said seat frame and serving as the sole supporting spring structure of the seat, one of said spring wires being shorter than the other of said spring wires and being terminally secured to said metal plates, and the other of said spring wires being uniform in length and being terminally secured to said metal strips.

3. A seat spring structure, comprising a seat frame having spaced substantially parallel longitudinally extending front and rear members and having spaced substantially parallel transversely extending side members terminally secured to said longitudinally extending members at opposite ends thereof, transversely extending metal strips welded to and extending lengthwise of said transversely extending members intermediate the ends thereof, horizontally disposed metal plates welded to the rear longitudinally extending member and to said transversely extending side members, and a single upwardly arched layer of load supporting spring wires extending longitudinally of said seat frame and serving as the sole supporting spring structure of the seat, one of said spring wires being shorter than the other of said spring wires and having at opposite ends thereof laterally extending attaching portions secured to said metal plates, and the other of said spring wires being uniform in length and having at opposite ends thereof laterally extending attaching portions secured to said metal strips.

4. A seat spring structure, comprising a seat frame having spaced substantially parallel longitudinally extending front and rear members and having spaced substantially parallel transversely extending side members terminally secured to said longitudinally extending members at opposite ends thereof, transversely extending metal strips welded to and extending lengthwise of said transversely extending members intermediate the ends thereof, the lower edges of said metal strips being provided at longitudinally spaced points thereof with tongues, horizontally disposed metal plates welded to the rear longitudinally extending member and to said transversely extending side members, each of said metal plates having a transversely extending groove therein and having aligned openings therein at opposite ends of said groove, and a single upwardly arched layer of load supporting spring wires extending longitudinally of said seat frame, one of said spring wires having at opposite ends thereof laterally extending attaching portions extending through the aligned openings and seated in the grooves in said metal plates, the other of said spring wires having at opposite ends thereof laterally extending attaching portions interlocked with the tongues of said metal strips.

5. The structure defined in claim 4, wherein the free ends of the attaching portions of said one wire are bent inwardly relative to said grooves to preclude such attaching portions from becoming accidentally disengaged from said grooves, and the free ends of the attaching portions of the other wires are bent inwardly relative to said tongues to preclude such attaching portions from becoming accidentally disengaged from said tongues.

6. A seat spring structure, comprising a seat frame having spaced substantially parallel longitudinally extending front and rear members and having spaced substantially parallel transversely extending side members terminally secured to said longitudinally extending members at opposite ends thereof, horizontally disposed metal plates secured to the rear longitudinally extending member and to said transversely extending side members, an upwardly arched layer of load supporting spring wires extending longitudinally of said seat frame, one of said spring wires being shorter than the other of said spring wires and being terminally secured to said metal plates, and means terminally securing the other of said spring wires to the transversely extending side members of said frame.

7. A seat spring structure, comprising a seat frame having spaced substantially parallel longitudinally extending front and rear members and having spaced substantially parallel transversely extending side members terminally secured to said longitudinally extending members at opposite ends thereof, horizontally disposed metal plates secured to the rear longitudinally extending member and to said transversely extending side members, each of said metal plates having a transversely extending groove therein and having aligned openings therein at opposite ends of said groove, an upwardly arched layer of load supporting spring wires extending longitudinally of said seat frame, one of said spring wires having at opposite ends thereof laterally extending attaching portions extending through said aligned openings and seated in the grooves in said metal plates, and means terminally securing the other of said spring wires to the transversely extending side members of said frame.

8. The structure defined in claim 7, wherein said metal plates have portions extending inwardly relative to said rear longitudinally extending member and relative to said transversely extending side members, and one of said spring wires spans the space between the inwardly extending portions of said metal plates and is shorter than the other of said spring wires.

References Cited in the file of this patent

UNITED STATES PATENTS

| | | |
|---|---|---|
| 2,217,290 | Nordmark | Oct. 8, 1940 |

FOREIGN PATENTS

| | | |
|---|---|---|
| 142,693 | Switzerland | Dec. 16, 1930 |
| 677,984 | Germany | Feb. 3, 1940 |
| 915,403 | France | July 22, 1946 |